United States Patent [19]
Hover, Sr. et al.

[11] Patent Number: 5,175,956
[45] Date of Patent: Jan. 5, 1993

[54] TRAPPING DEVICE FOR ANIMALS AND INSECTS

[76] Inventors: John S. Hover, Sr., P.O. Box 90114, East Point, Ga. 30364; Rein Raamat, 12 Park Lane Circle, Richmond Hill, Ontario, Canada, L4C 6S8

[21] Appl. No.: 798,566

[22] Filed: Nov. 26, 1991

Related U.S. Application Data

[63] Continuation-in-part of Ser. No. 430,381, Nov. 2, 1989.

[51] Int. Cl.⁵ ............................................. A01M 1/10
[52] U.S. Cl. ........................................... 43/58; 43/114
[58] Field of Search ............... 43/58, 60, 114, 115, 43/116, 64

[56] References Cited

U.S. PATENT DOCUMENTS

| | | | |
|---|---|---|---|
| 811,875 | 2/1908 | Samuels | 43/114 |
| 1,031,889 | 7/1912 | Ylieme | 43/116 |
| 1,379,734 | 5/1921 | Wagner | 43/116 |
| 3,398,478 | 8/1968 | Pearsall | 43/114 |
| 4,831,766 | 5/1989 | Giglietti | 43/60 |

FOREIGN PATENT DOCUMENTS

| | | | |
|---|---|---|---|
| 0100105 | 11/1898 | Fed. Rep. of Germany | 43/64 |
| 0387215 | 7/1908 | France | 43/116 |

*Primary Examiner*—Richard K. Seidel
*Assistant Examiner*—James Miner
*Attorney, Agent, or Firm*—Hopkins & Thomas

[57] ABSTRACT

An animal and insect trapping device is disclosed having a cylindrical form with an inner circumferential surface. A helical band of adhesive is disposed on this inner circumferential surface for trapping and holding the targeted species. The cylindrical member may include a window or be transparent for providing positive visual indication of the trapped species.

20 Claims, 2 Drawing Sheets

TRAPPING DEVICE FOR ANIMALS AND INSECTS

This application is a continuation-in-part of U.S. application Ser. No. 07/430,381, Filed Nov. 2, 1989, currently pending in the U.S. Patent & Trademark Office.

BACKGROUND OF THE INVENTION

Mousetraps, snares, and other such pest trapping or control devices have been supplied as spring-loaded traps, poisons in the form of anticoagulants or other more lethal formulations, or adhesive traps within which the pest gets stuck. An adhesive-type trap is illustrated by U.S. Pat. No. 3,398,478 to Pearsall. This device is in the form of a long tube with a floor that is free from adhesive. The walls and top are coated with adhesive to trap the pest when it attempts to turn around to leave the tube.

Another such trap is shown in U.S. Pat. No. 4,908,976 to Dagenais. This patent is essentially the same as the Pearsall patent, the only difference appearing to be the use of air-tight caps that are frictionally attached to the body of the trap. The use of caps per se is shown by Pearsall to be old. Various disadvantages are attendant each of the prior art devices, whether they be ineffective, dangerous to humans, particularly children, difficult to use or set, etc. In addition, most of the prior art devices are designed to be lethal to the target species. In many cases, there is an intent not to kill the animal, insect, etc. but to trap and study the target. Thus, a need continues to exist in the art for an effective pest control device that is both safe and easy to use and which is effective against its intended target.

SUMMARY OF THE INVENTION

It is, therefore, one of the principal objects of the present invention to provide a pest trapping device that is effective against a wide range of pests and completely non-toxic or otherwise non-hazardous to humans.

Another object of the present invention is to provide a pest trapping device that is economical to manufacture and use and which is extremely versatile in placement and use.

A further object of the present invention is to provide a pest control device that is easily handled both before trapping and after trapping the pest and which avoids the disadvantages of the prior art.

These and other objects are attained by the present invention which relates to a pest trapping device generally comprising an elongated tubular member having an adhesive means disposed in the interior of the tubular member. The adhesive means is disposed about the inner periphery of the tubular member in a helical pattern. This pattern provides economies in use and superior trapping ability to full-coverage traps or bait stations due to its thickness and spacing, discussion of which is contained hereinbelow. Indicator means are provided in certain of the disclosed embodiments for visual indication of a trapped pest and securing means are used for retention of the device at the locating site.

Various additional objects and advantages of the present invention will become apparent from the following description, with reference to the accompanying drawings.

DETAILED DESCRIPTION OF THE PREFERRED EMBODIMENT

Figure 1:
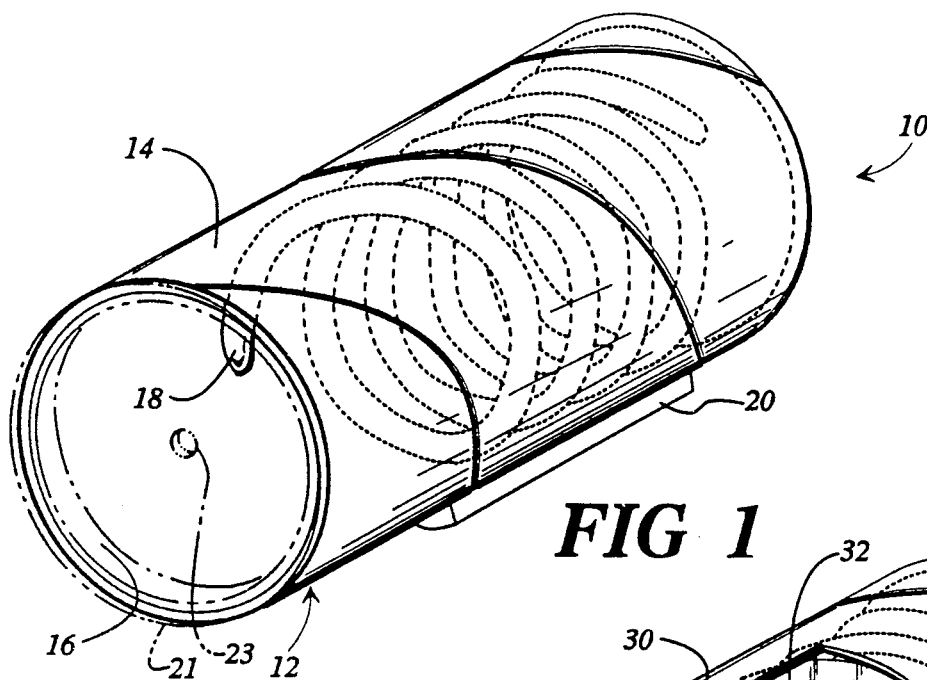
FIG. 1 is a perspective view of one embodiment of the present pest trapping device.

Referring now more specifically to the drawings and to FIG. 1 in particular, numeral 10 designates generally the present pest trapping device, here having the form of a solid spiral wound paper tube 12. The tube 12 has an outer peripheral surface 14 and an inner peripheral surface 16. Disposed on the inner peripheral surface 16 is a pest retaining and trapping means such as adhesive 18. The adhesive is applied in a helical pattern as illustrated in broken lines. The helical pattern of adhesive is disposed primarily in the central region of the tube 12; however, the helix could be extended throughout the inner periphery of the tube, or it can be located at one end or the other. The centralized location is however, the preferred embodiment. Disposed against the outer periphery 14 of tube 12 is a securing means such as double faced tape 20. This allows the device to be placed in virtually any orientation, i.e. horizontal, vertical, etc. and in virtually any location where pests are a problem or trapping is desired. The securing means may also comprise magnets, nails, screws, etc.

Illustrated in phantom lines in FIG. 1 is a cap means 21 that may be provided with an aperture 23. The cap is used during shipping to protect the inner glued surface from dust and other contaminants. The cap may also be weighted so that when a pest is ensnared and is to be killed, the tube may be submerged in water, oil, etc. to drown the pest. In this regard the aperture 23 serves as an inlet for the particular fluid. The aperture may also be used to hold a knotted string or the like (not shown) for suspending the tube in a vertical position. Cap means will normally be supplied for both ends of the tube in this and other embodiments described herein.

The helical pattern of adhesive offers several advantages over the thinly spread or coated adhesive devices known in the prior art. The relatively thick beads of adhesive which form the helix snare more of the pest, for example, the feet of a mouse, than does a device having a thin coat of adhesive. This effect is achieved while economies are also realized in that the entire inner periphery of the tube need not be coated. This is of particular advantage when the device is used for trapping animals, insects, etc. for study. Maximum efficiency is achieved with larger pests that are to be eradicated, however, in that the pest is entirely encircled by the adhesive means for ensnaring the pests from all sides. The beads of adhesive normally range from 1/32" to ¼" in height with the distance between the beads ranging from 1/16" to 1". The width of the bead will normally vary depending on the target species, however, a general range would be from 1/32" to 1" wide, inclusive. Variations are contemplated and are considered to be within the scope of the present invention.

Naturally, the invention may be provided in a plurality of sizes, depending on its intended use.

Figure 2:
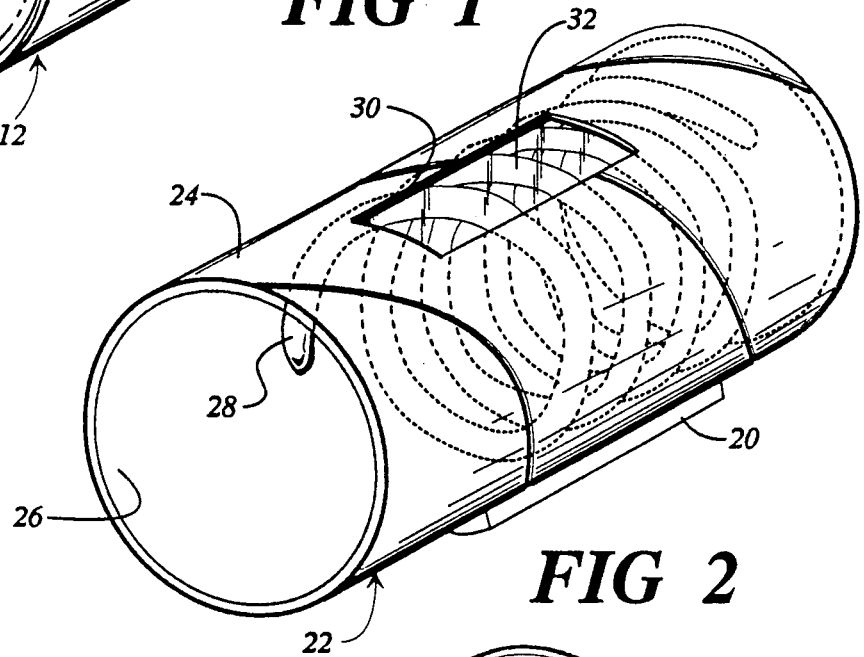
FIG. 2 is a perspective view of another embodiment of the present invention.

FIG. 2 illustrates a similar embodiment, the tube 22 having an outer peripheral surface 24, and an inner peripheral surface 26 with a helical band of adhesive 28 applied to the inner peripheral surface 26. This embodiment includes means forming an aperture 30 in the tube 22, the aperture normally being covered by a transparent or translucent window 32. This provides to the user a visual indication that a target species has been trapped in the device. As with the first embodiment, the second alternate embodiment includes a securing means such as double faced tape 20 to facilitate placement and retention of the device at the desired location.

Figure 3:
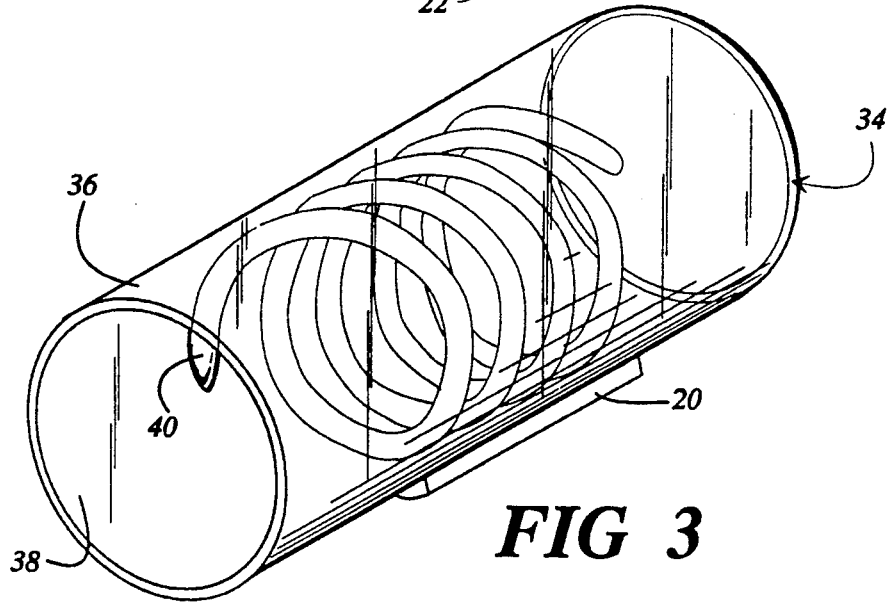
FIG. 3 is a perspective view of a third alternate embodiment of the present invention.

FIG. 3 illustrates a third embodiment of the present invention, this embodiment having a transparent or translucent tube 34 having an outer peripheral surface 36 and an inner peripheral surface 38. Applied to the inner peripheral surface 38 is a spiral band of adhesive 40 as with the previously described embodiments. This embodiment, like that shown in FIG. 2 also provides a positive visual indication that the target species is trapped in the device. Further indicator means can include for example, a substance such as a heat sensitive plastic, that lightens, darkens, or changes color in response to heat or warming inside the tube, as from a trapped animal.

Figure 4:
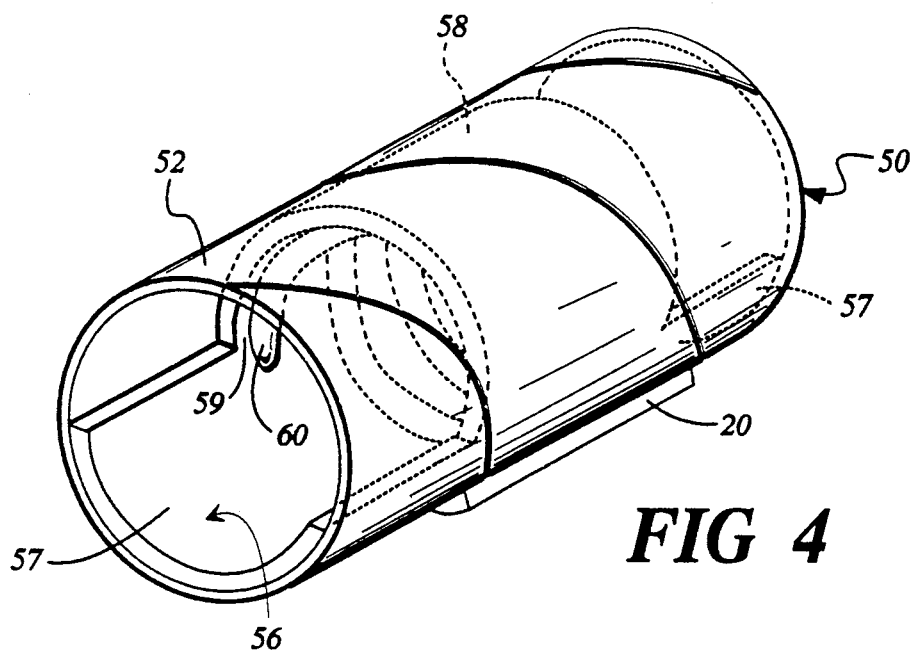
FIG. 4 is a perspective view of a fourth alternate embodiment of the present invention.

FIG. 4 illustrates a fourth alternate embodiment of the present invention, this embodiment having a tube 50 that may be a spiral wound paper tube, or a continuous plastic extrusion. The tube 50 has an outer peripheral surface 52 and an inner peripheral surface 54. Disposed within the tube 50 is a removable and disposable insert 56. The insert includes right and left semi-circular end portions 57 joined by a full circumference surface portion 58 having an inner circumferential surface portion 59. Disposed on this inner circumferential surface portion 59 is a spiral band of adhesive 60 as in the previous embodiments.

This embodiment also includes the reusable double faced tape 20 for placement and retention of the device in a selected location. The insert 56 is designed to be disposable while the outer tube 50 is meant to be reused with a new insert. As the insert is loosely disposed within the outer tube 50, the tube 50 may simply be tilted to one side to cause the insert to slide out of the tube, obviating any handling of the insert and the trapped pest.

Figure 5:
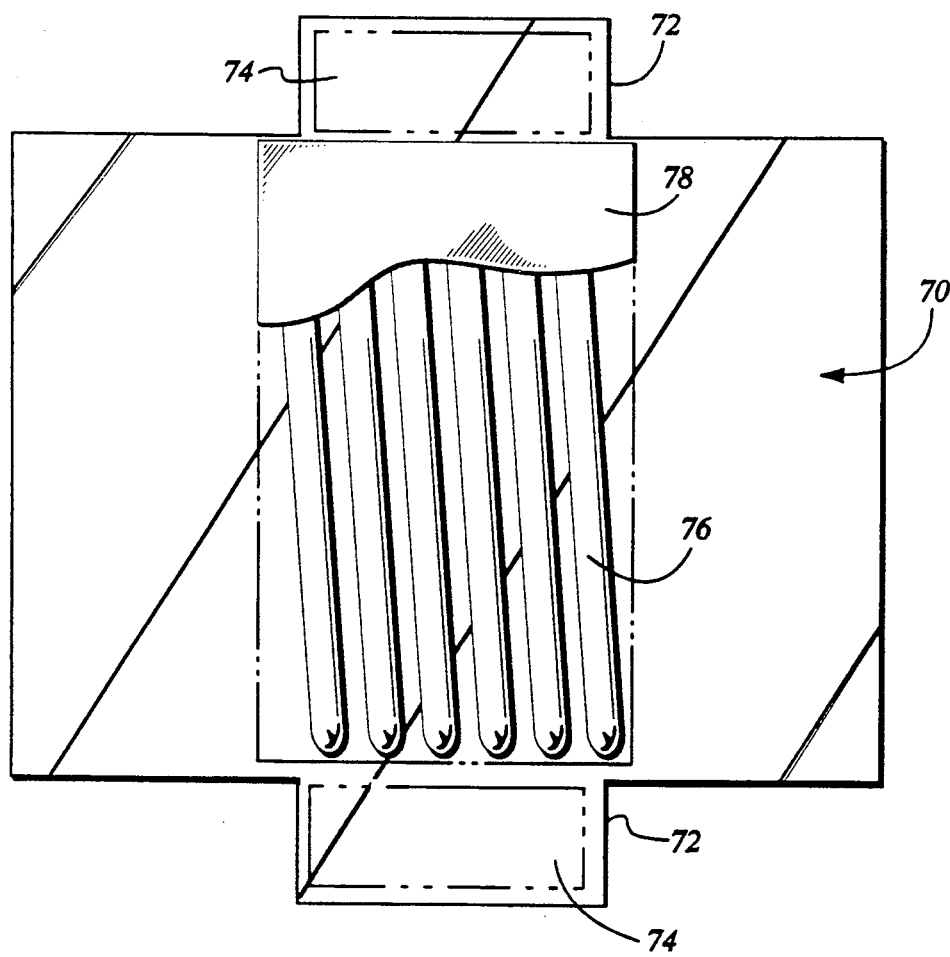
FIG. 5 is a top plan view of a fifth alternate embodiment of the present invention, shown prior to its formation into operative form.

A fifth alternate embodiment of the present invention is illustrated in FIG. 5. In this embodiment, a blank 70 of paper or other suitable material is provided, the blank 70 having tabs 72 which extend in opposite directions from one another from the periphery of the blank 70. The blank is designed to be rolled into a tubular form with the tabs 72 being mated and held together by an adhesive means such as tape 74. This permits the invention to be conveniently packaged in a flat form and formed into its tubular configuration prior to use. The adhesive means 76 is disposed on the central region of the blank 70, and is arranged to form a spiral configuration when the blank 70 is rolled into tubular form. A removable cover sheet 78 is provided over the adhesive to facilitate packaging and shipping of the device in its flattened form.

Common to all of the disclosed embodiments is the unique spiral or helical arrangement of adhesive means, which, as noted, provides economies in production as well as superior trapping ability relative to the known prior art devices. The adhesive may be any of a number of products currently on the market, and may include attractants directed to a certain species. The attractants can be hormonal or food scents, carob, sugar, etc., or the user may add their own attractant, i.e. syrup, peanut butter, etc. The present invention also provides means for visually indicating the presence of a trapped animal, insect, etc. which visual indication means may be extended to all of the disclosed embodiments.

Thus, while an embodiment of a trapping device for animals insects, etc. and modifications thereof have been shown and described in detail herein, various additional changes and modifications may be made without departing from the scope of the present invention.

I claim:

1. An animal and insect trapping device comprising:
   an elongated tubular member having an open end and inner and outer peripheral surfaces,
   animal retaining adhesive means on said inner peripheral surface of said tubular member, said adhesive means having a spiral configuration comprising a bead of adhesive with spacing between the coils of the spiral extending over at least a portion of the length of said tubular member for holding an animal or insect contacting said retaining means and retaining same within said tubular member.

2. A trapping device as defined in claim 1 in which said tubular member includes an indicator means associated therewith for providing a visual indication of a trapped animal or insect.

3. A trapping device as defined in claim 1 in which said tubular member is transparent.

4. A trapping device as defined in claim 1 in which said tubular member includes securing means for holding said tubular member in a selected position.

5. A trapping device as defined in claim 1 in which said tubular member is supplied as a planar blank and is configured into tubular form by the user.

6. A trapping device as defined in claim 1 in which said device includes cap means for said tubular member, said cap means having an aperture formed therein for permitting ingress of a fluid.

7. A disposable animal and insect trapping device comprising:
   means defining a hollow member having first and second ends and an inner surface, at least one of said ends being open, and
   a raised bead of animal retentive adhesive material deposited on said inner surface to form a continuous helix of retentive material, said helix comprising a bead of adhesive with spacing between the coils of the helix extending at least partially between said first and second ends, such that an animal entering said open end is held within said hollow member by said adhesive material.

8. A trapping device as defined in claim 7 in which said hollow member includes a viewing window means disposed therein for providing a visual indication of a trapped animal or insect.

9. A trapping device as defined in claim 7 in which said hollow member is transparent.

10. A trapping device as defined in claim 7 in which said hollow member includes securing means for holding said hollow member in a selected position.

11. A trap for the live trapping of mice and other pests comprising:

an elongated hollow member having an open end and comprising one or more walls forming a continuous inner surface of said hollow member, an adhesive deposited on said inner surface to form an elongated helix of adhesive within said hollow member, said helix comprising an elongated bead of adhesive with spacing between the coils of the helix, and an aperture in at least one of said walls.

12. A trapping device as defined in claim 11 in which said hollow member includes a viewing window means disposed over said aperture for providing a visual indication of a trapped animal or insect.

13. A trapping device as defined in claim 11 in which said hollow member is transparent.

14. A trapping device as defined in claim 13 in which said hollow member includes securing means for holding said hollow member in a selected position.

15. A trapping device as defined in claim 11 in which said hollow member includes securing means for holding said hollow member in a selected position.

16. A trapping device for the live trapping of animals and insects, comprising a tubular member having at least one open end, an insert means loosely disposed in said tubular member, said insert means having at least a portion thereof formed into cylindrical form with an inner circumferential surface, said cylindrical portion having an adhesive means deposited on said inner circumferential surface in a helical form and comprising an elongated bead of adhesive with spacing between the coils of the helical form for retaining therein an animal or insect which contacts said adhesive means.

17. A trapping device as defined in claim 16 in which said tubular member includes a viewing window means disposed therein for providing a visual indication of a trapped animal or insect.

18. A trapping device as defined in claim 16 in which said tubular member is transparent.

19. A trapping device as defined in claim 16 in which said tubular member includes securing means for holding said tubular member in a selected position.

20. A trapping device as defined in claim 19 in which said device includes cap means for said tubular member, said cap means having an aperture formed therein for permitting ingress of a fluid.

* * * * *